United States Patent Office 3,651,148
Patented Mar. 21, 1972

3,651,148
2-(6-METHOXY-2-NAPHTHYL)-1-PROPYL BORANES
Peter H. Nelson, Los Altos, Calif., assignor to Syntex Corporation, Panama, Panama
No Drawing. Filed Sept. 30, 1969, Ser. No. 862,475
Int. Cl. C07f 5/02; C07c 43/20
U.S. Cl. 260—606.5 B
2 Claims

ABSTRACT OF THE DISCLOSURE

This invention relates to 2-(6-methoxy-2-naphthyl)-1-propyl boranes useful in the preparation of 2-(6-methoxy-2-naphthyl) propionic acid and 2-(6-methoxy-2-naphthyl)-1-propanol.

These products have anti-inflammatory, analgesic and anti-pyretic activities.

---

This invention relates to processes for preparing 2-(6-methoxy-2-naphthyl)propanol and 2-(6-methoxy-2-naphthyl)propionic acid and intermediates therefor.

In general, the process of this invention for preparing 2-(6-methoxy-2-naphthyl)-1-propanol comprises the steps of reacting a borane compound selected from the group of compounds which can be represented by the formula

wherein $R^1$, $R^2$ and $R^3$ each is a 2-(6-methoxy-2-naphthyl)-1-propyl, alkyl, cycloalkyl or aralkyl group and at least one of $R^1$, $R^2$ and $R^3$ is said 2-(6-methoxy-2-naphthyl)-1-propyl group, with hydrogen peroxide in an aqueous solution of an inorganic base until 2-(6-methoxy-2-naphthyl)propanol is formed; and separating the latter compound from the reaction mixture. The boron compound

is prepared by reacting in an ether solvent, 6-methoxy-2-(2-propenyl)naphthalene with a respective diborane or a borane compound having the formula

wherein $R^4$ is hydrogen, alkyl, cycloalkyl or aralkyl; and $R^5$ is alkyl, cycloalkyl or aralkyl.

In general, the process of this invention for preparing 2-(6-methoxy-2-naphthyl)propionic acid comprises reacting a borane compound selected from the group of compounds which can be represented by the formula

wherein $R^1$, $R^2$ and $R^3$ each is a 2-(6-methoxy-2-naphthyl)-1-propyl, alkyl, cycloalkyl or aralkyl group and at least one of $R^1$, $R^2$ and $R^3$ is said 2-(6-methoxy-2-naphthyl)-1-propyl group, with chromium trioxide in an aqueous solution of a lower alkyl carboxylic acid until 2-(6-methoxy-2-naphthyl)propionic acid is formed; and separating the latter compound from the reaction mixture. If the product is a dl-mixture, it is preferably resolved to obtain d 2-(6-methoxy-2-naphthyl)propionic acid as the final product.

The processes of this invention can be represented by the following formulas

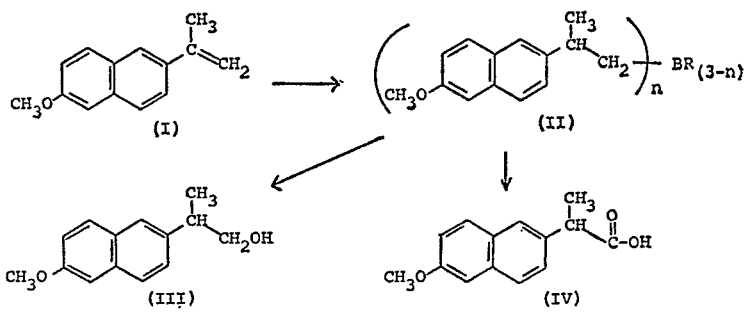

In the above Formula II,

R is an alkyl, cycloalkyl or aralkyl group, and
n is an integer of from 1 to 3.

The term "alkyl" includes primary, secondary and tertiary alkyl groups of straight and branched chain configuration, preferably having up to 24 carbons, and most preferably being a "lower alkyl" group, that is, having up to 6 carbons. Examples are methyl, ethyl, propyl, isopropyl, n-butyl, n-hexyl, n-decyl, n-dodecyl and the like. The term "aralkyl" refers to alkyl groups substituted by an unsubstituted or substituted phenyl group and preferably having up to 10 carbons such as 2-phenylethyl, 3-phenylpropyl and the like. The term "cycloalkyl" refers to cycloalkyl groups having from 3 to 8 carbons, either unsubstituted or substituted by one or more alkyl, cycloalkyl, or aralkyl groups. Included within the definition of cycloalkyl are complex molecules such as steroids and terpenes such as alpha and beta-pinenes.

The trisubstituted boranes of Formula II are prepared by reacting the compound of Formula I with diborane or a borane compound having the formula

in an ether solvent. In the above formula, $R^4$ and $R^5$ are as previously defined.

If $R^4$ and $R^5$ both are a hindered, optically active group, optically active compounds of Formulas III and IV can sometimes be obtained.

The ether solvents suitable for this reaction are not critical. Suitable ethers include diethyl ether, diglyme, tetrahydrofuran and the like.

This reaction can be conducted at a temperature of from 0 to 40° C. The time required for the reaction is dependent upon the temperature, times of from 1 to 6 hours usually being sufficient.

The compound of Formula III is prepared by treating the compound of Formula II with hydrogen peroxide in an aqueous solution of an inorganic base such as an alkali metal hydroxide or carbonate, e.g., sodium hydroxide, lithium hydroxide, potassium hydroxide, sodium carbonate, potassium carbonate and the like. Base concentrations in the solution can be from 1 to 10 weight percent. The amount of hydrogen peroxide in the solution should be at least 3 and preferably above 5 molar equivalents.

This reaction is conducted at a temperature of 0° C. to 60° C., preferably at about 40° C. The time required for the reaction is dependent upon the temperature. Times of from 30 minutes to 12 hours are usually sufficient. The compound of Formula III is then separated from the reaction mixture by conventional techniques. For example, the reaction mixture can be extracted with ether, and the ether phase evaporated to dryness to yield 2-(6-methoxy-2-naphthyl)-1-propanol which is recrystallized from acetone-hexane. Alternatively, other techniques including chromatography can be used to isolate the compound of Formula III.

The compound of Formula IV is prepared by treating a compound of Formula II with chromium trioxide in an aqueous solution of a lower alkyl carboxylic acid such as acetic acid, n-propionic acid, n-butyric acid, valeric acid and the like. The aqueous solution should contain from about 10 to 95 and preferably from 80 to 90 weight percent of the acid. At least 1 and preferably from 2 to 10 molar equivalents of chromium trioxide should be present in the reaction mixture.

The reaction can be carried out at a temperature of from 0° C. to 40° C., preferably at about room temperature. The time required for the reaction is dependent upon the temperature, times of from 1 to 48 hours usually being sufficient.

The compound of Formula IV is then separated from the reaction mixture by conventional techniques. For example, the reaction mixture can be diluted with water and extracted with ether. The ether phase is then removed, washed with an aqueous solution of sodium bisulfate and then with water, dried, and evaporated to dryness to yield the compound of Formula IV. The latter compound can be recrystallized from acetone-hexane. Alternatively, other techniques including chromatography can be used to isolate and/or purify the compound of Formula IV.

The preferred compound of Formula IV is d 2-(6-methoxy-2-naphthyl)propionic acid. To obtain this product, optical resolution of the compound of Formula IV can be achieved by selective biological degradation or by preparation of diastereo isomer salts of the 2-(6-methoxy-2-naphthyl)propionic acid with a resolved optically active amine base such as cinchonidine and then separating the thus formed diastereo isomers by fractional crystallization. The separated diastereo isomer salts are then acid cleaved to yield the respective d 2-(6-methoxy-2-naphthyl)propionic acid.

The preferred compound of Formula III is l 2-(6-methoxy-2-naphthyl)-1-propanol. This can be prepared by optical resolution of the compounds of Formula III such as by selective biological degradation or by preparation of diastereo isomer salts of the phthalic acid ester of the 2-(6-methoxy-2-naphthyl)-1-propanol with a resolved optically active amine base such as cinchonidine and then separating the thus formed isomer by fractional crystallization. The separated isomer salts are then acid cleaved to yield the respective ester which is then hydrolyzed to yield the corresponding l 2-(6-methoxy-2-naphthyl)-1-propanol.

The compound of Formula I can be prepared by reacting 2-acetyl-6-methoxynaphthalene (a known compound) with methyl magnesium bromide in THF at reflux temperature followed by the addition of a mineral acid and a further period of reflux, diluting the reaction mixture with water, and extracting the aqueous mixture with chloroform. The chloroform extracts are then dried and evaporated to dryness to yield the compound of Formula I.

The compounds of Formulas III and IV exhibit anti-inflammatory, analgesic and anti-pyretic activities and are accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fracture, post-traumatic conditions and gout.

This invention is further illustrated by the following specific but non-limiting examples.

EXAMPLE 1

A solution of 10 g. of 6-methoxy-2-(2-propenyl)naphthalene in 100 ml. of ether is treated with a solution of diborane in tetrahydrofuran until analysis by thin layer chromatography indicates the reaction is complete. The mixture is then treated at 0° C. with 50 ml. of 3 N aqueous sodium hydroxide and 20 ml. of 30 percent hydrogen peroxide added in portions over a 30 minute period. After stirring for 4 hours at 40° C., water is added to the reaction mixture, and the product is extracted with ether. The ether phase is evaporated to dryness to yield 2-(6-methoxy-2-naphthyl)-1-propanol which is recrystallized from acetone-hexane.

EXAMPLE 2

A solution of 10 g. of 6-methoxy-2-(2-propenyl)-naphthalene in 100 ml. of ether is treated with a solution of diborane in tetrahydrofuran until analysis by thin layer chromatography indicates the reaction is complete. The mixture is then treated at 0° C. with 10 g. of chromium trioxide in 50 ml. of water and 10 ml. of acetic acid added in portions during 30 minutes. After stirring for 2 hours at 20° C., the reaction mixture is diluted with water and extracted with ether. The ether phase is washed with an aqueous solution of sodium bisulfate and then with water. The ether phase is then evaporated to dryness to yield 2-(6-methoxy-2-naphthyl)-propionic acid which is recrystallized from acetone-hexane.

EXAMPLE 3

A solution of dl 2-(6-methoxy-2-naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

EXAMPLE 4

A mixture of 22 g. of 2-(6-methoxy-2-naphthyl)propanol, 30 g. of phthalic anhydride and 500 ml. of pyridine is stirred for 6 hours at room temperature. The resulting mixture is then diluted with water and extracted with methylene chloride. The combined extracts are washed with water, aqueous 0.1 N hydrochloric acid, and with water to neutrality, dried over sodium sulfate and evaporated to dryness to yield the phthalic acid ester which is crystallized from aqueous ethanol.

This ester (36 g.), 29 g. of cinchonidine and 500 ml. of methanol is stirred for 2 hours. The mixture is then allowed to stand until crystallization is complete. The crystals are removed by filtration and washed with methanol (the filtrate and washings are collected). The crystals are then recrystallized from methanol, filtered, washed and dried. The pure crystals are added to 600 ml. of 0.2 N hydrochloric acid, and the resulting mixture is stirred for 2 hours and then extracted with diethyl ether. The extracts are combined, washed with water to neutrality, dried over sodium sulfate and evaporated.

The resulting residue is added to a mixture of 5 g. of sodium hydroxide, 250 ml. of water and 250 ml. of tetrahydrofuran. After the resulting mixture has stood for 2 hours at 23° C., the mixture is extracted with methylene chloride. The combined extracts are washed with aqueous acid and then with water to neutrality, dried over sodium sulfate and evaporated to yield one of the optical isomers of 2-(6-methoxy-2-naphthyl)propanol.

The combined filtrates and washings are evaporated, and the residue is treated as above to cleave the cinchonidine salt and hydrolyze the ester to yield the other optical isomer of 2-(6-methoxy-2-naphthyl)propanol.

I claim:
1. A compound selected from the group of compounds represented by the formula

wherein $R^1$, $R^2$ and $R^3$ each is a 2-(6-methoxy-2-naphthyl)-1-propyl, alkyl, cycloalkyl or aralkyl group and at least one of said $R^1$, $R^2$ and $R^3$ is a 2-(6-methoxy-2-naphthyl)-1-propyl group.

2. As a compound of claim 1, tri-(2-((6-methoxy-2-naphthyl))-1-propyl)-borane.

References Cited
UNITED STATES PATENTS 3,230,262  1/1966  Koster _____ 260—606.5 B
3,279,908  10/1966  Crawford et al. __ 260—606.5 B TOBIAS E. LEVOW, Primary Examiner W. F. W. BELLAMY, Assistant Examiner U.S. Cl. X.R.
260—520, 613